United States Patent [19]
Keelan et al.

[11] Patent Number: 5,609,404
[45] Date of Patent: Mar. 11, 1997

[54] APPARATUS AND RELATED METHOD FOR CORRECTING SLIDE WARPAGE IN A SLIDE PROJECTOR

[75] Inventors: Brian W. Keelan, Rochester; Daniel M. Pagano, Honeoye Falls, both of N.Y.

[73] Assignee: Eastman Kodak Company, Rochester, N.Y.

[21] Appl. No.: 632,867

[22] Filed: Apr. 16, 1996

[51] Int. Cl.⁶ .................................................. G03B 21/14
[52] U.S. Cl. ........................... 353/101; 353/60; 353/69; 353/121
[58] Field of Search ................................ 353/101, 95, 96, 353/53, 52, 60, 69, 121

[56] References Cited

U.S. PATENT DOCUMENTS

| | | | |
|---|---|---|---|
| 2,947,215 | 8/1960 | Mitchell | 353/101 |
| 2,949,815 | 8/1960 | Rosenberger et al. | 88/28 |
| 3,116,662 | 1/1964 | Rosenberger et al. | 88/28 |
| 3,179,007 | 4/1965 | Benford | 88/28 |
| 3,205,766 | 9/1965 | Ewald | 353/52 |
| 3,264,935 | 8/1966 | Vose | 353/101 |
| 3,326,081 | 6/1967 | White | 353/101 |
| 3,342,102 | 9/1967 | Maxon | 353/101 |
| 3,617,119 | 11/1971 | Pagel | 352/140 |
| 3,672,757 | 6/1972 | Szymber et al. | 353/101 |
| 3,748,033 | 7/1973 | Harvey | 353/101 |
| 3,861,794 | 1/1975 | Sobotta | 353/101 |
| 4,743,109 | 5/1988 | Harvey | 353/101 |

*Primary Examiner*—William Dowling
*Attorney, Agent, or Firm*—Peter J. Bilinski

[57] ABSTRACT

Heat generated by the projection lamp in a projecting apparatus is used to individually pop slides having improper curvature due to heat deformation. According to the invention, a slide positioned in the projection gate of the projector exhibits incorrect curvature, preferably as detected by the autofocus system of the projector, a door is opened allowing dry heat from the projection lamp to be applied directly to the slide, preferably until the slide reverts to a proper or normal curvature.

14 Claims, 2 Drawing Sheets

APPARATUS AND RELATED METHOD FOR CORRECTING SLIDE WARPAGE IN A SLIDE PROJECTOR

FIELD OF THE INVENTION

The invention relates generally to the field of photography, and in particular to slide projectors. More specifically, the invention relates to apparatus and a related method for correcting photographic slides having improper curvature in order to restore good center-to-edge image sharpness when projecting the slides in a slide projector.

BACKGROUND OF THE INVENTION

Most consumers who project slides use glassless slides and curved-field projector lenses, which compensate for the natural curvature of the film in an open slide mount. The curvature is due to the relative absorption of moisture by the film gelatin and the plastic film support, and hence is affected by the relative humidity of the ambient air. The use of a curved-field lens with glassless slides produces excellent center-to-edge sharpness uniformity of the slide under ideal conditions.

However, under moderate to high humidity conditions, film will often curve in the opposite direction, in which case the curvature of the film and the curvature of the lens add rather than cancel, producing even worse center-to-edge uniformity. If the slide is held in the slide projector gate long enough, however, it will usually "pop", or abruptly reverse curvature direction, analogously to an oil-can bottom which "pops" when it is depressed. This reverse curling occurs because the slide projection gate is usually warmer, and therefore drier than the ambient air. However, this procedure can take tens of seconds, which is longer than the time usually taken for the projection of a single slide.

A number of methods have been employed to handle such problems as described above in the event that a slide has not "popped". In some professionals applications, slide mounts incorporating two pieces of glass are used to constrain the displacement of the film from a flat plane. Such mounts, though successful in achieving excellent center-to-edge sharpness uniformity, are about ten times more expensive than glassless mounts, and also have the disadvantages of sometimes trapping moisture and generally producing increased flare due to the four air-glass surfaces present.

Commonly assigned U.S. Pat. No. 4,743,109 teaches the use of the projector's autofocus system to detect individual slides having an incorrect curvature. According to this reference, when a slide with improper curvature is detected by the autofocus system, the projection lens is stopped down in order to increase the depth of focus at the film plane due to the displacement of the slide, and thereby reduce the lack of uniformity in the center to edge sharpness. The disadvantage of this technique is that the display brightness is decreased abruptly in a manner which is evident to the viewer, whose eyes must re-adapt to the reduced brightness before the projected image can be discerned. In addition, if the images are projected in a room with ambient light present, the quality of the tone reproduction of the image is decreased due to the decreased image brightness.

Some slide projectors pre-warm each of the slides at a position in the slide tray several slides ahead of the slide to be projected. Though this method is partially effective in "popping" slides having an incorrect curvature, there is a drawback affecting slides which have a correct curvature in that all slides are indiscriminately pre-heated. This increases the likelihood of dust becoming affixed to the slide, and leads to concerns regarding the archival preservation of the slide. Given these tradeoffs, the warm air flow in such a projector is normally set to a relatively low level, which then is not fully effective in popping slides having improper curvature.

Therefore, there is a need to correct the center-to-edge uniformity present in slide elements having a reverse curvature without impacting image quality or brightness.

SUMMARY OF THE INVENTION

The present invention is directed to overcoming one or more of the problems set forth above. Briefly summarized, according to one aspect of the present invention, there is provided in a slide projector, apparatus for correcting warpage of a slide placed in said projector, said slide projector comprising a housing, a lamp disposed in a compartment of said housing, a projecting station or gate into which individual slides are positioned for projection by said lamp, a circulating fan for drawing heat generated from said lamp, and detecting means for detecting whether a slide positioned in the projection gate has a curvature which is greater than a predetermined value, characterized by:

a door member separating said circulating fan and said projection gate; and control means cooperative with said door member and said detecting means to open said door member when a slide having a curvature greater than the predetermined value has been detected in said projection gate to direct heated air from said lamp onto said slide.

According to another aspect of the present invention, there is described a method of correcting warpage of a slide in a slide projector, comprising the steps of:

i) detecting the amount of warpage on a slide to be projected by the slide projector; and ii) applying a quantity of forced hot air onto the slide if the amount of warpage is greater than a predetermined value.

According to yet another aspect of the present invention, there is provided apparatus for correcting slide warpage of an individual slide positioned for projection in a slide projector, comprising:

a housing;

a projection lamp disposed within said housing;

circulating means for circulating heated air generated by said lamp; and a projection gate within said housing into which individual slides are sequentially positioned for projection by said lamp, is characterized by:

a door separating said projection gate from said circulating means, said door being openable to allow circulated heated air from said lamp to be applied directly to an individual slide.

Preferably, the projector auto-focus system can be used to detect whether a slide has improper curvature when the slide is presented at the projection gate or station, and if so detected, a door member can be opened automatically to permit hot, dry air, preferably drawn from the projector lamp, to be directly applied to the slide. The application of hot, dry air causes the slide to "pop" quickly back to a proper curvature, and thereby avoid prolonged viewing of slide images with poor center-to-edge sharpness.

An advantage provided by the present invention is that slide elements can be corrected individually for incorrect curvature utilizing features already present in the projector in that the autofocus system can be used to detect the curvature of the slide, and heat generated from the lamp can be used.

A further advantage is that slides can be popped quickly due to the selective application of heat directly upon the slide, allowing the viewer to view slides in a normal rather than a prolonged manner.

These and other aspects, objects, features and advantages of the present invention will be more clearly understood and appreciated from a review of the following Detailed Description of the Preferred Embodiments and appended claims, and by reference to the accompanying drawings.

DETAILED DESCRIPTION OF THE INVENTION

Figure 1:
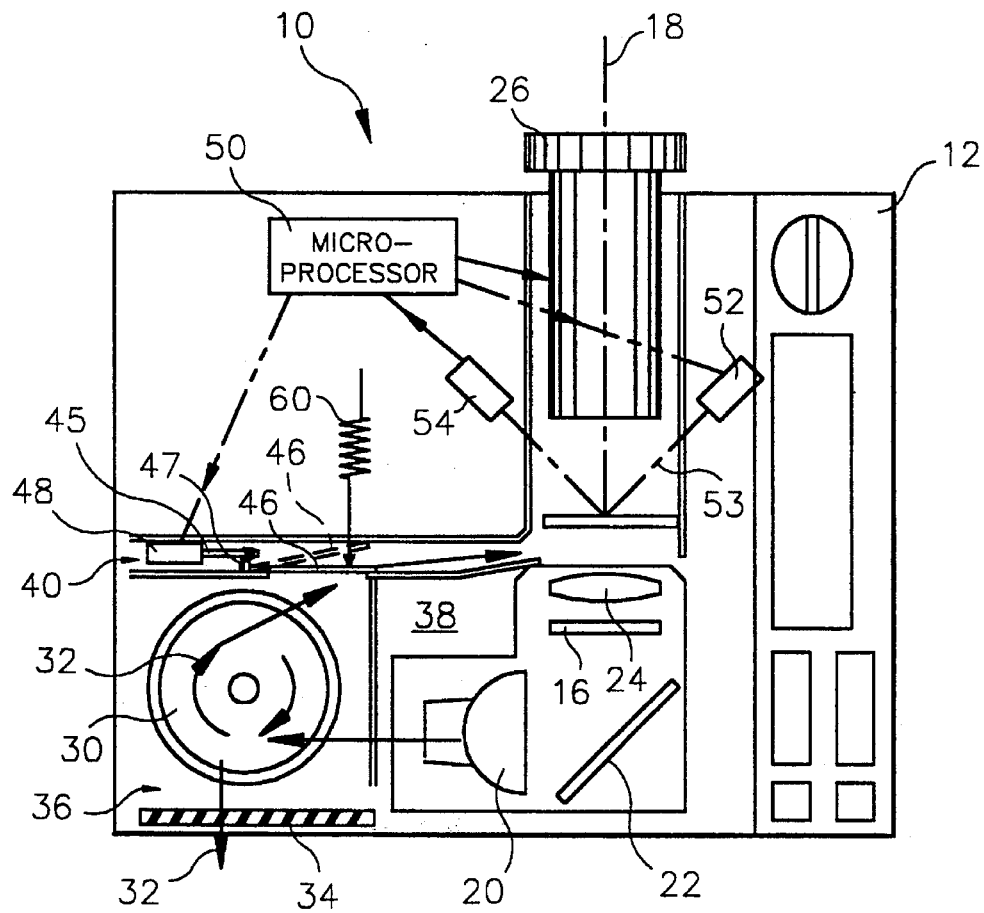
FIG. 1 is a top view of a slide projector, partially schematic, according to a preferred embodiment of the present invention.

Referring to the FIGS, there is shown a projector 10 which is constructed in accordance with the prior art. Projector 10 includes a main housing or body 12 including a projection gate or station 13 into which a photographic slide 14 is supported substantially and centered onto a projection axis 18. Typically, a circular or other tray member (not shown) is positioned onto the top of the body and individual slides are dropped into and out of the projection gate 13 for viewing. These particular aspects are commonly known in the prior art and do not form a part of the present invention.

As noted, a slide 14 entering the projector gate 13 acquires heat deformation, which is visible as a deviation between the center of the slide 14 and a calibrated set position. This deviation, is herein described as a "pop" distance.

The projector 10 also includes a lamp 20 disposed within a compartment 38 of the housing for projecting light through the transparent slide 14 and onto a viewing screen (not shown). The lamp 20, according to this particular embodiment, is aligned perpendicular to the projection axis 18, though other configurations are of course easily imagined. Light from the lamp 20 strikes a mirror 22 and is passed through a first fixed projecting lens 24 and a heat absorbing glass 16 prior to passing through the slide 14 positioned in the projection gate 13. A second movable projecting lens 26 coaxial to the projecting axis 18 focuses the slide as projected onto the viewing screen (not shown).

Included within the projector 10 is a microprocessor 50, as well as an emitter 52 and a detector 54 pair which are electrically connected to the microprocessor 50. The emitter 52 and the detector 54 are oriented with respect to the projection gate 13 such as shown in FIG. 1, so that each are aligned with the center of the slide 14 relative to the projection axis 18 in order to measure the relative displacement of the slide film.

Figure 2:
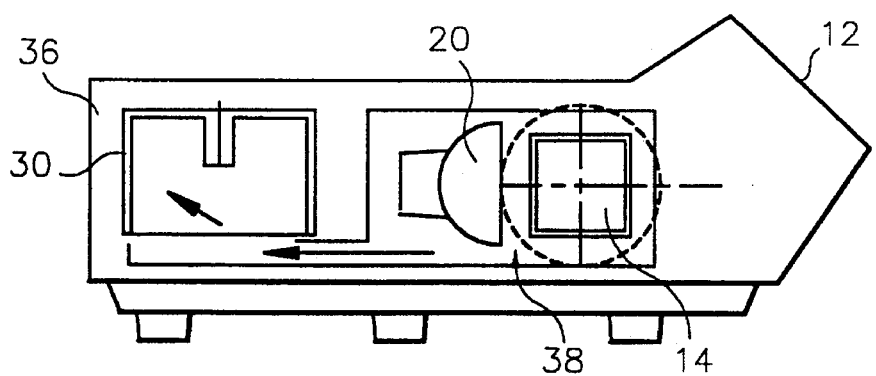
FIG. 2 is a side elevational view, partially in section, of the projector shown in FIG. 1.
Figure 3:
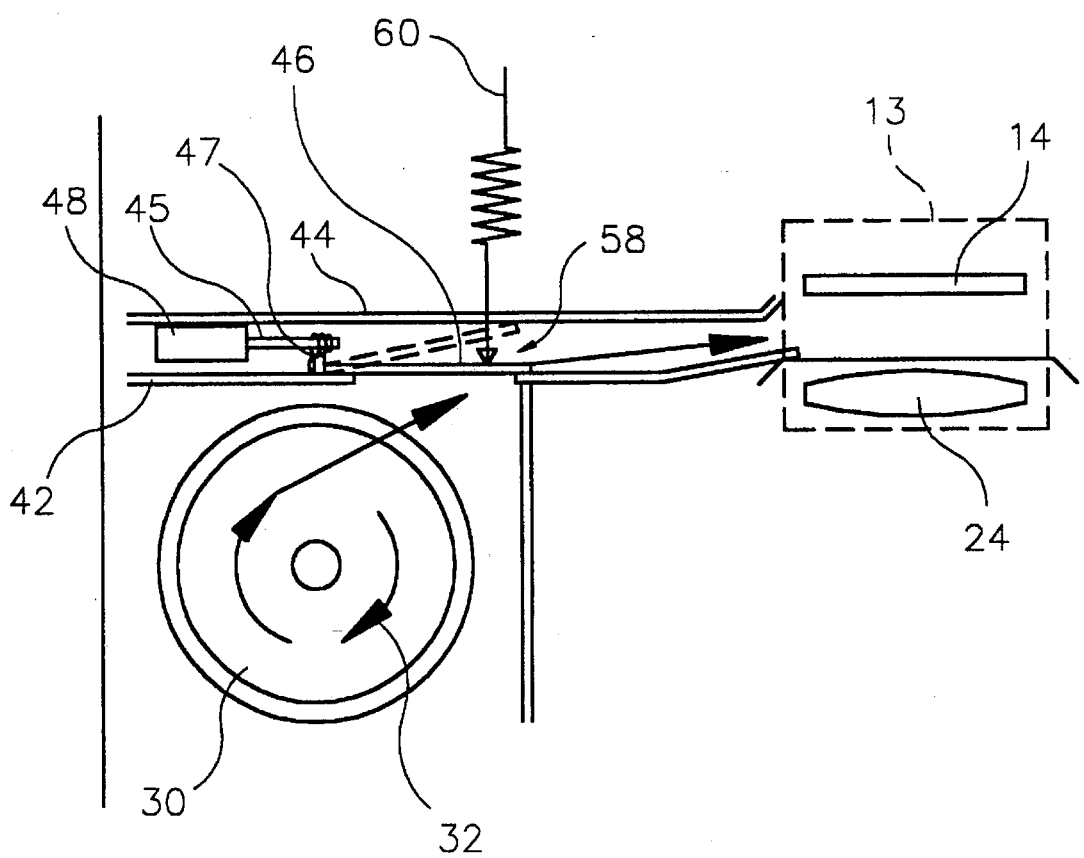
FIG. 3 is an enlarged view of the door portion of the projector depicted in FIG. 1.

Referring specifically to FIG. 2, heat generated from the lamp 20 is typically drawn by an adjacently disposed squirrel cage or other type of circulating fan 30 which is then circulated in a clockwise direction as shown by arrows 32 away from the projector 10 through a set of air vents 34 located on the exterior of the projector housing 12 to expel the heat. The fan 30 is housed in a chamber or compartment 36 within the housing 12 and adjacent the lamp 20.

According to the present invention, a channel 40 is formed adjacent to the projection gate 13 between the fan compartment 36, the lamp assembly compartment 38 and the remainder of the projector 10 defined by a pair of interior walls 42, 44. Preferably, the channel 40 necks at the end proximate the projection gate 13 for reasons detailed below.

A door member 46 is formed along the interior wall 42 of the channel 40 which also serves as an interior wall of the fan compartment 36. The door 46 is supported at one end furthest from the projection gate 13 to the wall 42 and to a solenoid 48 mounted preferably within the channel 40. The solenoid 48 is electrically connected to the microprocessor 50 so that when energized the solenoid 48 drives an actuating arm 45 attached to the solenoid and to a hinged point 47 of the door 46. The door 46 then pivots about the hinged point 47 to expose an opening 58 from the fan compartment 36 into the channel 40. The door 46 is biased in a closed position relative to the opening 58 by an attached return spring 60.

The emitter beam, 53 shown in FIG. 1, is detected by the adjacent detector 54 to measure the amount of warpage of the slide 14. If a slide 14 having excessive warpage is detected by the autofocus mechanism of the projector 10, then a signal is generated by the microprocessor 50 to the solenoid 48, positioned adjacent the door 46 in order to pull the actuating arm 45 and pulling the door to the position shown in phantom, against the biasing of the return spring 60.

If a nominal or correct distance is detected by the microprocessor 50 indicating the slide already has a correct curvature, then no signal is sent to the solenoid 48, and hot air from the lamp 20 continues to be circulated by the fan 30 through the air vents 34. The distance detected by the detector 54 and signaled to the microprocessor 50 is compared to a stored range of values stored in electronic memory.

Additional details describing the measurement of the "pop" distance of a slide 14 are described in commonly assigned U.S. patent application Ser. No. 4,743,109, which is hereby incorporated by reference.

It should be readily apparent that other mechanical or electrical devices can be used to operate the door 46; for example, a mechanical actuator or other means capable of pulling the door member open can be utilized.

The opening of the door 46 causes a portion of the warmed air which is being circulated by the squirrel cage fan 30, since the fan blades are rotated in the clockwise direction illustrated, to be directed through the door opening 58 and into the channel 40 toward the projection gate 13 for directly impinging the air onto a slide 14. Preferably, the channel 40 is narrowed in the area closest to the projection gate 13 as shown, to guide the air in a concentrated manner to correct the slide warpage.

The circulated hot air taken from the lamp 20, having been warmed to a temperature considerably higher than that of ambient air, is correspondingly lower in relative humidity than the ambient air. This differential causes moisture to be drawn from the film, causing the slide to "pop", and restoring the desired curvature for good center-to-edge uniformity in a period on average of generally between about 3–10 seconds. This range is subject to variability depending on the differences in humidity, the amount of heat drawn from the lamp, and other factors.

After sufficient heat has been applied to the slide 14 at the projection gate 13, the slide 14 pops to a desired curvature. By maintaining the emitter 52 and detector 54 on the slide 14, the change in curvature can be detected by the detector 54 and micropocessor 50 which thereafter sends a signal to the movable projecting lens 26 to refocus to the center of the slide 14, as is previously known and described in cross-referenced U.S. patent application Ser. No. 4,743,109. Simultaneously, with the detection of the slide 14 "popping" to a proper curvature, the solenoid 48 is deactivated by the microprocessor 50 and the door 46 is closed under the bias of the return spring 60.

Variations in the above described method are possible. For example, rather than relying on the autofocus system for detecting the amount of curvature present on a presented slide 14 at any given time, the door 46 can be made to open and/or close according to a predetermined time period, or in the event another slide is sequenced into the projection gate 13.

The invention has been described with reference to a preferred embodiment. However, it will be appreciated that variations and modifications can be effected by a person of ordinary skill in the art without departing from the scope of the invention.

PARTS LIST FOR FIGS. 1–3

10 projector
12 housing
13 projection station or gate
14 slide
16 heat absorbing glass
18 projecting axis
20 projection lamp
22 mirror
24 fixed projecting lens
26 movable projecting lens
30 fan—circulating
32 arrows
34 air vents
36 compartment—fan
38 compartment—lamp
40 channel
43 interior wall
44 interior wall
45 actuating arm
46 door
47 hinged point
48 solenoid
50 microprocessor
52 emitter
53 emitter beam
54 detector
58 opening
60 return spring

We claim:

1. A method of correcting warpage of a slide in a slide projector, comprising the steps of:
   i) detecting the amount of warpage on a slide to be projected by the slide projector; and
   ii) applying a quantity of forced hot air onto the slide if the amount of warpage is greater than a predetermined value.

2. A method according to claim 1, including the step of stopping the supply of forced hot air when the warpage of the slide reaches the predetermined value.

3. A method as recited in claim 1, including the step of stopping the supply of forced hot air onto the slide after a predetermined time.

4. A method as recited in claim 1, including the step of stopping the supply of forced hot air when a new slide is to be projected by the slide projector.

5. A method as recited in claim 1, wherein the projector includes a projection lamp, and a circulation means for drawing heat away from the lamp in which the method includes the step of directing the circulated air from the lamp onto the slide having warpage greater than the predetermined value.

6. A method as recited in claim 5, in which the projector includes a door separating the circulating means from a projection gate in which the slide is to be projected, wherein the method includes the step of opening the door to release hot air from the lamp onto a slide positioned in the projection gate after the slide has been detected to have warpage greater than the predetermined value.

7. A method of correcting improper curvature of a slide in a slide projector, comprising the steps of:
   i) positioning a slide in a projection gate of a projector;
   ii) measuring an amount of curvature present in the slide;
   iii) comparing the amount of curvature to determine if the amount of curvature of the slide exceeds a predetermined value; and
   iv) applying a quantity of forced warm air solely onto said slide in the projection gate if the amount of curvature exceeds the predetermined value.

8. In a slide projector, apparatus for correcting warpage of a slide placed in said projector, said slide projector comprising a housing, a lamp disposed in a compartment of said housing, a projection gate into which individual slides are positioned for projection by said lamp, a circulating fan for drawing heat generated from said lamp, and detecting means for detecting a warped slide in the projection gate, whether a slide positioned has a curvature which is greater than a predetermined value, is characterized by:
   a door member separating said circulating fan and said projection gate; and
   control means cooperative with said door member and said detecting means to open said door member when a slide having a curvature exceeding the predetermined value has been detected in said projection gate to direct heated air from said lamp onto said slide.

9. Apparatus for correcting slide warpage of an individual slide positioned for projection in a slide projector, comprising:
   a housing;
   a projection lamp disposed within said housing;
   circulating means for circulating heated air generated by said lamp; and
   a projection gate within said housing into which individual slides are sequentially positioned for projection by said lamp, is characterized by:
   a door separating said projection gate from said circulating means, said door being openable to allow circulated heated air from said lamp to be applied directly to an individual slide.

10. Apparatus as recited in claim 9, including detecting means for detecting the presence of a slide in said projecting gate having a curvature in excess of a predetermined value and control means cooperative with said detecting means and said door to open said door when a slide having a curvature in excess of the predetermined value is detected.

11. Apparatus as recited in claim 10, including directing means for directing circulated heated air from said lamp to said projecting gate when said door is opened.

12. Apparatus as recited in claim 11, wherein said directing means includes a channel separating said circulating means from said projecting gate through which circulated air is directed when said door is opened.

13. Apparatus as recited in claim 10, including opening means for opening and closing said door, said opening means being responsive to said detecting means to open said door when said detecting means detects a slide in the projection gate having a curvature in excess of the predetermined value.

14. Apparatus as recited in claim 13, including biasing means for biasing said door in a closed position when a slide positioned in said projection gate and having a curvature which is in excess of the predetermined value is not detected by said detecting means.

* * * * *